United States Patent
Pekkanen et al.

(10) Patent No.: US 6,702,055 B1
(45) Date of Patent: Mar. 9, 2004

(54) HYDROSTATIC TRAVELLING MECHANISM

(75) Inventors: Jukka Pekkanen, Tampere (FI); Stefan Rinck, Weissenhorn (DE); Michael Brand, Ulm (DE)

(73) Assignee: Bosch Rexroth AG, Lohr am Main (DE)

( * ) Notice: Subject to any disclaimer, the term of this patent is extended or adjusted under 35 U.S.C. 154(b) by 0 days.

(21) Appl. No.: 09/979,342

(22) PCT Filed: May 10, 2000

(86) PCT No.: PCT/EP00/04263
§ 371 (c)(1),
(2), (4) Date: Jan. 8, 2002

(87) PCT Pub. No.: WO00/71379
PCT Pub. Date: Nov. 30, 2000

(30) Foreign Application Priority Data

May 21, 1999 (DE) ............................... 199 23 516

(51) Int. Cl.[7] .................................. B60K 17/356
(52) U.S. Cl. ................................ 180/242; 180/53.4
(58) Field of Search ................... 180/242, 53.4

(56) References Cited

FOREIGN PATENT DOCUMENTS

| DE | 25 28 735 A1 | 4/1976 |
|----|----|----|
| DE | 195 24 189 C2 | 1/1997 |
| DE | 197 50 367 A1 | 6/1999 |
| EP | 0 752 545 A2 | 1/1997 |
| EP | 0 916 541 A1 | 5/1999 |
| FR | 2 741 130 A1 | 5/1997 |
| JP | 08177010 | 7/1996 |

*Primary Examiner*—Lesley D. Morris
*Assistant Examiner*—Matthew Luby
(74) *Attorney, Agent, or Firm*—Scully, Scott, Murphy & Presser

(57) ABSTRACT

The invention relates to a hydrostatic traveling mechanism (4) that comprises a closed hydraulic circuit (6) in which a first hydraulic pump (4) with a first hydraulic engine (12) is linked with a flow pipe (7) and a return pipe (8). Said hydraulic engine (12) drives the vehicle wheels (14, 15, 18, 19) of two first vehicle axles (17, 20). According to the invention, an additional open hydraulic circuit (9) is used in which a second hydraulic engine (22) and a third hydraulic engine (24) are linked with a second hydraulic pump (5) via a supply pipe (11) and a control valve (21). Said second hydraulic engine (22) and said third hydraulic engine (24) drive the vehicle wheels (23, 25) of a second vehicle axle (36).

8 Claims, 4 Drawing Sheets

HYDROSTATIC TRAVELLING MECHANISM

The invention relates to a hydrostatic drive for driving a vehicle, in particular a commercial vehicle for use in forestry.

A hydrostatic drive according to the precharacterising clause of claim 1 is known, for example, from DE 195 24 189 C2. In this known hydrostatic drive, a hydraulic pump arranged with a hydraulic motor in a closed hydraulic circuit is driven by means of an internal combustion engine. Both the hydraulic pump and the hydraulic motor can be adjusted by an electrically controlled adjusting device in dependence on electrical control signals generated by an electrical control unit. The hydraulic motor drives the vehicle wheels of a vehicle axle via a change-speed gear and a differential gear. The disadvantage of this hydrostatic drive is that the drive takes place exclusively via a closed hydraulic circuit. The connection of the hydraulic motor to the hydraulic pump is relatively rigid, so that in the event of load alternation, in particular on uneven and rough terrain, spinning of the driving wheels frequently results. The mechanical differential gear has the disadvantage that, on rough terrain, a differential lock is necessary. When the differential gear is locked, however, slipping of the driving wheels when cornering inevitably occurs, resulting, particularly when used in forestry, in damage to the ground, which is to be avoided as far as possible.

Mobile implements used on rough terrain, in particular forestry implements, are frequently equipped with two or more driven vehicle axles, a vehicle joint allowing an angular offset between the driven vehicle axles in order to give the mobile implement the necessary off-road mobility. In this case, the driving of the vehicle axles is a particular problem. A known solution is to connect the vehicle axles by a cardan shaft. However, this involves a relatively high degree of structural complexity. The rigid coupling of the vehicle axles has the disadvantage of increasing soil erosion. Moreover, the maximum angular offset of the driven vehicle axles is limited by the cardan shaft.

Furthermore, it is known to drive the driven vehicle axles by means of separate hydraulic motors which are connected to a common hydraulic pump by a closed hydraulic circuit. Here, too, there is the disadvantage of undesirably high soil erosion due to the rigid hydraulic coupling. In mobile implements where the main function consists in the hydraulic operation of tools and where the hydrostatic drive is merely assigned an auxiliary function, it is known to operate the hydrostatic drive exclusively in an open hydraulic circuit. The disadvantage of this, however, is the low efficiency and the low torque which can be generated.

The object on which the invention is based therefore is to specify a hydrostatic drive in which both high efficiency and high torque are achieved with little damage to the ground.

The object is achieved by the characterising features of claim 1 in conjunction with the generic features.

According to the invention, a hydrostatic drive is provided which combines the advantages of a drive via an open hydraulic circuit with the advantages of a drive via a closed hydraulic circuit. According to the invention, two drive trains are therefore provided. In a first drive train a first hydraulic pump cooperates with a first hydraulic motor in a closed hydraulic circuit, whereas in a second drive train a second hydraulic pump cooperates with a second hydraulic motor in an open hydraulic circuit. The two hydraulic motors in this case drive different vehicle wheels, preferably different vehicle axles. A relatively high torque can be achieved with the drive train having a closed hydraulic circuit. In the drive train having the open hydraulic circuit the hydraulic motor is coupled relatively loosely to the hydraulic pump, enabling the rotational speed of the vehicle wheels driven by this drive train to adapt dynamically to the circumstances defined by the condition of the ground and the obstacles on the ground. As a result, account is taken of the fact that the rotational speeds of the two differently driven vehicle axles deviate from one another considerably when, for example, one of the two vehicle axles negotiates an obstacle. If the two vehicle axles are rigidly coupled to one another hydraulic or mechanically, as in the prior art, this would lead to slipping of one of the two vehicle axles, which inevitably causes damage to the ground. Through the relatively loose coupling, according to the invention, of the hydraulic motor to the hydraulic pump in one of the two drive trains, the rotational-speed differences described are for a short time equalised in the open hydraulic circuit. Since one of the vehicle axles is driven via a closed hydraulic circuit, however, a high torque can be generated nevertheless.

The subclaims relate to advantageous developments of the invention.

It is advantageous to arrange a control valve in the forward-flow line of the open hydraulic circuit. Preferably, two hydraulic motors driving opposite vehicle wheels of a vehicle axle are connected to the control valve of the open hydraulic circuit. The control valve then makes it possible for these hydraulic motors to be apportioned individual volumetric flows, so that given suitable control of the control valve a differential action can be achieved. At the same time, the apportioning of different volumetric flows to these two hydraulic motors also allows the vehicle to be steered. If the vehicle axles are not rigidly aligned with one another, as is customary in commercial vehicles for use in forestry, but rather the vehicle body is provided with a joint which allows a kink angle between the vehicle axles, then this kink angle can be increased or decreased in a specific manner by differential driving of the hydraulic motors connected to the control valve.

Furthermore, in the drive train having an open hydraulic circuit, the hydraulic motors provided there can be switched off during high-speed operation, for example on a forest road, so that the drive then takes place only via the closed hydraulic circuit. This has the advantage that the hydraulic motors operated in the open circuit do not have to run at a high rotational speed as well.

The open hydraulic circuit can, furthermore, be used at the same time for driving further hydraulic components, for example a saw, crane, etc. without an additional hydraulic pump being necessary for driving these further hydraulic components.

The invention is described in more detail below with reference to the drawing, in which:

FIG. 1 shows the components of the hydrostatic drive 1 required to understand the invention in a basic hydraulic circuit diagram.

Figure 1:
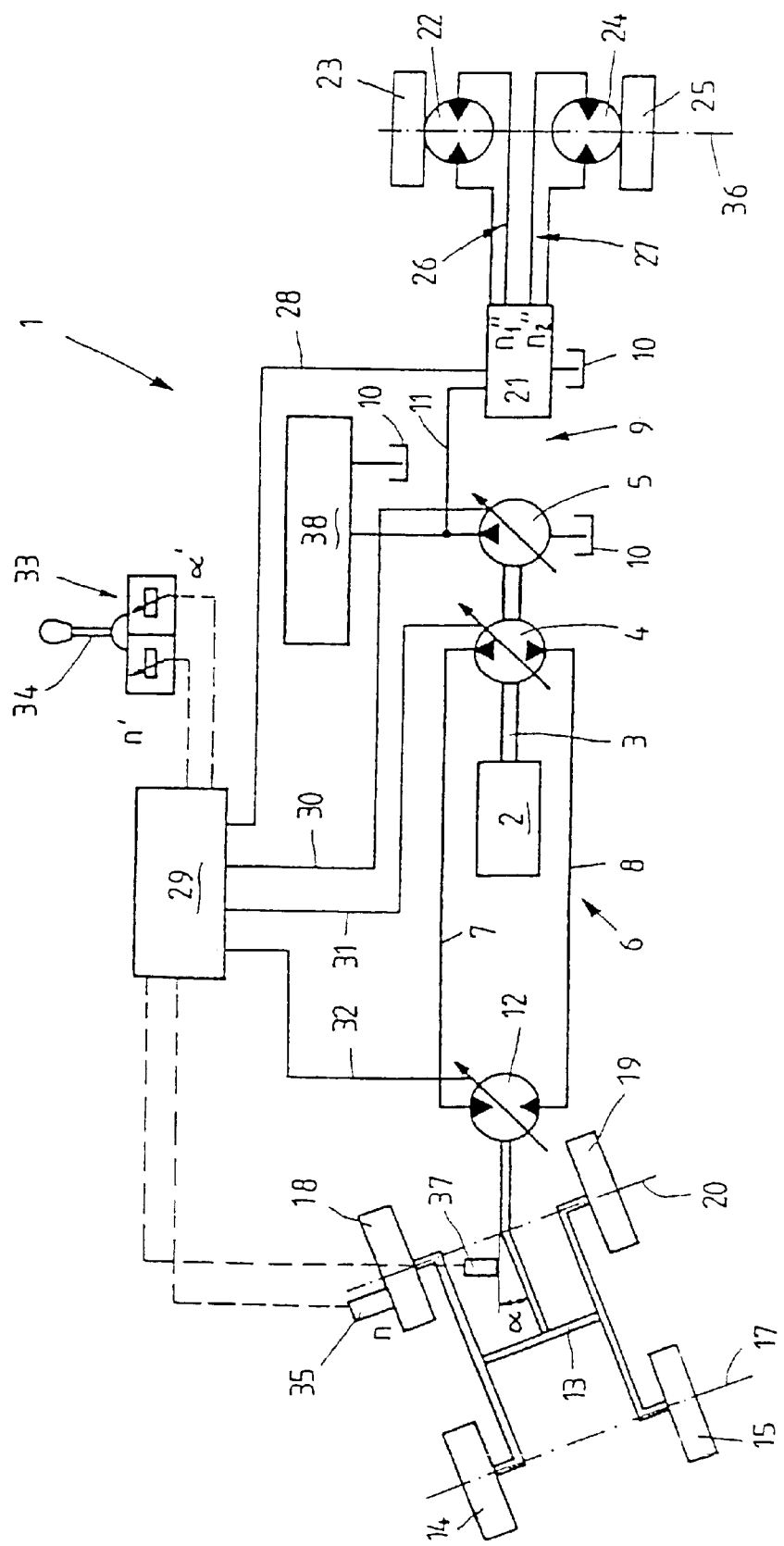
FIG. 1 shows a basic hydraulic circuit diagram of a first exemplary embodiment of the invention.

A internal combustion engine 2, for example a diesel engine, is used to drive a first hydraulic pump 4 and a second hydraulic pump 5 via a common drive shaft 3. The hydraulic pumps 4 and 5 can be designed, for example, as a compact double pump. According to the invention, the hydrostatic drive 1 has both a closed hydraulic circuit 6 with a forward-flow line 7 and a return-flow line 8 and an open hydraulic circuit 9. In the open hydraulic circuit 9, the hydraulic pump 5 draws the hydraulic fluid out of a hydraulic fluid tank 10 and feeds it into a supply line 11. Various hydraulic consumers are connected to the supply line 11 and cause the hydraulic fluid to flow back into the hydraulic fluid tank 10.

In the closed hydraulic circuit 6, a first hydraulic motor 12 is situated between the forward-flow line 7 and the return-flow line 8 and drives the vehicle wheels 14 and 15 of a first vehicle axle 17 and the vehicle wheels 18 and 19 of a third vehicle axle 20 via a mechanical drive train 13. In the closed hydraulic circuit, the function of the forward-flow and return-flow line is reversed when the direction of rotation of the hydraulic motor 12 is reversed. In the exemplary embodiment, the vehicle wheels 14 to 19 form the front wheels of the vehicle to be driven, for example a commercial vehicle for use in forestry.

In the open hydraulic circuit 9, a control valve 21 is situated between the supply line 11 and the hydraulic fluid tank 10. A second hydraulic motor 22, which drives a vehicle wheel 23, and a third hydraulic motor 24, which drives a vehicle wheel 25, are connected to the control valve 21 via hydraulic circuits 26 and 27. The hydraulic circuits 26 and 27 are designed as open hydraulic circuits in the exemplary embodiment.

The control valve 21 is connected via an electrical control line 28 to a drive controller 29, which is connected to adjusting devices of the hydraulic pumps 4 and 5 and an adjusting device of the hydraulic motor 12 via further electrical control lines 30, 31 and 32. The drive controller 29 is controlled by the operator via a control transmitter 33.

The drive controller 29 can operate as a follow-up controller, the drive of the rear wheels 23 and 25 taking place in dependence on the drive of the front wheels 14, 15, 18 and 19. The lever 34, for example a joystick, is used to preset the vehicle travelling speed desired by the operator or the desired rotational speed n' corresponding to this vehicle speed. In the electronic drive controller 29, this desired rotational speed n' is compared with the actual rotational speed n determined by a sensor 35, for example, on the third vehicle axle 20. By appropriately controlling the adjusting devices of the hydraulic pump 4 and of the hydraulic motor 12 in the closed hydraulic circuit 6, the actual rotational speed n is adjusted to the desired rotational speed n'. Since the coupling of the hydraulic motor 12 to the hydraulic pump 4 in the closed hydraulic circuit 6 is relatively rigid, a relatively high torque can be transmitted to the vehicle wheels 14, 15, 18 and 20 in this drive train.

The control valve 21 in the open hydraulic circuit 9 is controlled by the drive controller 29 in such a way that the hydraulic motors 22 and 24 are apportioned such a volumetric flow that the driving wheels 23 and 25 rotate in a substantially slip-free manner. The volumetric flows preset separately for the second hydraulic motor 22 and the third hydraulic motor 24 by the control valve 21 correspond to the rotational speeds n1" and n2" of the vehicle wheels 23 and 25, respectively. If an obstacle, for example a tree trunk, occurs on the route and therefore the rotational speeds n on the one hand and n1" and n2" on the other hand, determined by the drive controller, for a short time when negotiating the obstacle do not match the calculated values, such a short-time difference in the rotational speeds is equalised by the hydrostatic drive according to the invention, since the hydraulic motors 22 and 24 of the open hydraulic circuit 9 are coupled relatively loosely to the hydraulic pump 5. A high degree of slip, which would lead to damage of the ground, does not occur.

When cornering, the two hydraulic motors 22 and 24 are apportioned, by suitable control of the control valve 21 by the drive controller 29, a volumetric flow which differs in such a way that differential equalisation on the second vehicle axle 36 is taken into account. A differential gear and a differential lock are not necessary. A differential lock which may be present on the first and third vehicle axle 17 and 20 does not generally have to be actuated, since the vehicle wheels 23 and 25 of the second vehicle axle 36 are constantly locked relative to one another. This reduces damage to the ground.

The vehicle axles 17 and 20 of the front wheels 14, 15, 18 and 19 can be pivoted by a pivot angle α in relation to the vehicle axle 36 of the rear wheels 23 and 25 in order to achieve a greater off-road mobility of the vehicle. To this end, an appropriate joint is provided on the vehicle body (not illustrated). The actual kink angle α formed by the vehicle axles 17 and 20 in relation to the vehicle axle 36 can be detected by a sensor 37 and evaluated by the drive controller 29. Through the vehicle cornering control, which can be influenced by the lever 34 of the control transmitter 33, a desired kink angle α' is specified and is likewise supplied to the drive controller 29. The control valve 21 is then supplied with a control signal via the control line 28 in such a way that during the apportioning of the volumetric flows for the two hydraulic motors 22 and 24 the kink angle α and the resultant radius of curve are taken into account. To match the actual kink angle α to the desired kink angle α', an additional rotational-speed difference can be generated in the hydraulic motors 22 and 24 via the control valve 21, so that the control valve 21 enables steering of the vehicle.

The open hydraulic circuit 9 can be used at the same time for driving further hydraulic components, for example a crane, a saw or a harvester head. These further hydraulic components are schematically indicated in FIG. 1 by the reference numeral 38. Advantageously, a further hydraulic pump is not necessary for driving these further hydraulic components 38, the second hydraulic pump 5 being used both for the hydrostatic partial drive by means of the open hydraulic circuit 9 and for driving these additional hydraulic components 38.

Figure 2:
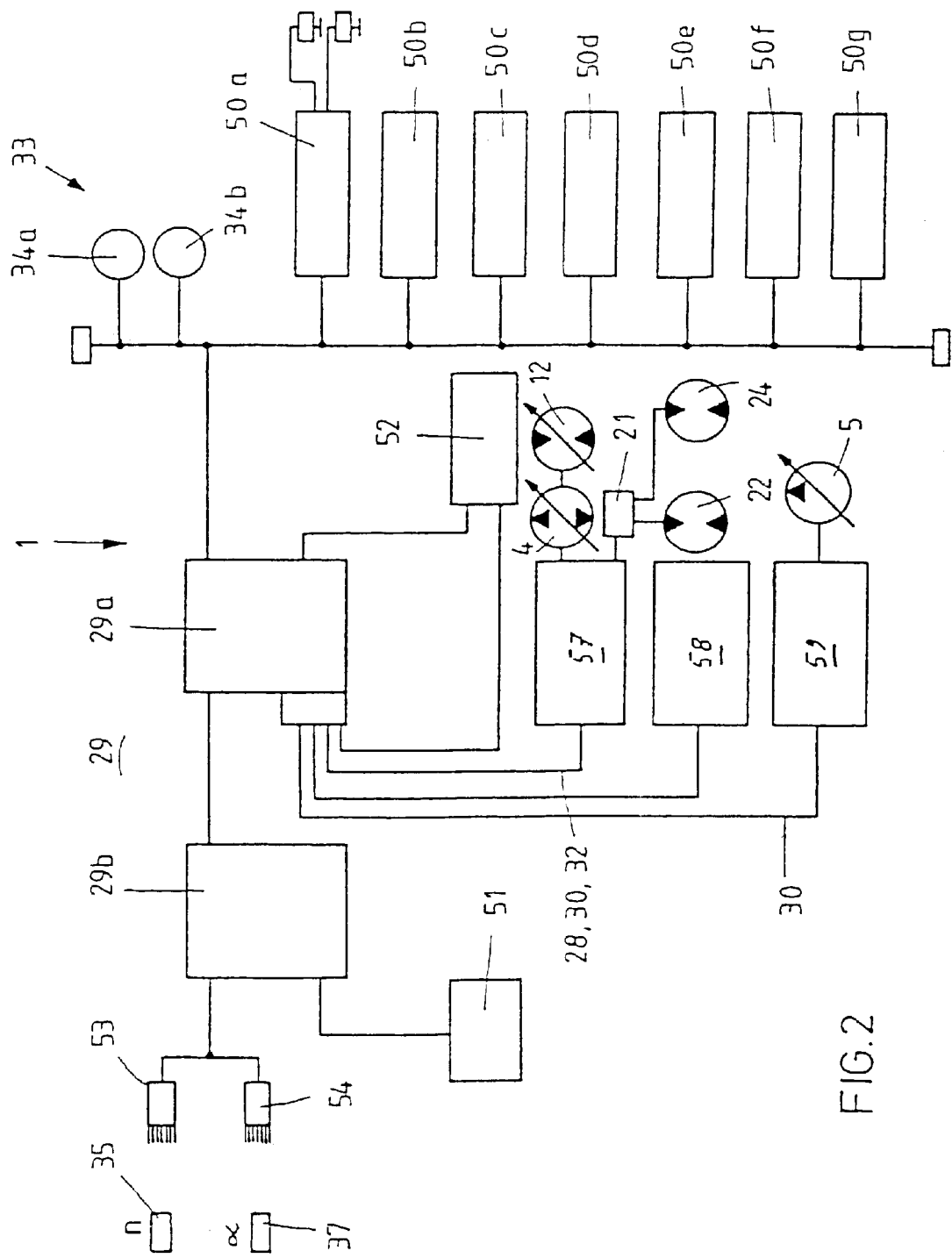
FIG. 2 shows a basic electronic circuit diagram of the first exemplary embodiment of the invention.

FIG. 2 shows a basic electronic circuit diagram of the hydrostatic drive 1 according to the invention corresponding to the exemplary embodiment illustrated in FIG. 1.

In the exemplary embodiment, the control transmitter 33 comprises two control levers 34a and 34b which are connected via an electrical bus system on the one hand to the drive controller 29 and on the other hand directly to various hydraulic components 50a to 50g of the vehicle to be driven, which perform working functions on the crane, such as slewing, lifting and also actuation of jib, telescope, crane base and steering. These hydraulic components 50a to 50g are, for their part, connected to the supply line 11 of the open hydraulic circuit 9 preferably via load-sensing valves. Control via the bus system is relatively flexible and easy to construct by comparison with a hydraulic control.

The drive controller 29 consists of the actual control component 29a and the vehicle electrics 29b. The vehicle electrics 29b have inputs/outputs 53 and 54, to which, for example, the sensors 35 and 37 can be connected. However, it is also possible, for example, to connect lighting components of the vehicle or other operating components to these inputs/outputs 53, 54. The vehicle electrics 29b have a display 51, by means of which the functions of the vehicle can be monitored by the operator. All the components are interconnected via bus systems. The drive controller 29 is used, as described, to control the drive of the front axles 17, 20 and of the rear axle 36 via the hydraulic pump 4 and the hydraulic motor 12 of the closed hydraulic circuit 6, and via the control valve 21 of the open hydraulic circuit 9, respectively. Furthermore, the pivot angle of the second hydraulic pump 5 serving as working pump is specified by a corresponding electronic control signal. The harvester head 52 is also controlled in this way. To this end, electronically controllable control receivers 57–59 are provided. The control receiver 57 is used to control the drive, the control receiver 58 is used to control the steering and the control receiver 59 is used to control the second hydraulic pump 5.

The electronic control components ensure a high degree of flexibility. As a result of the modular construction, the system can be readily expanded for new components.

Figure 3A:
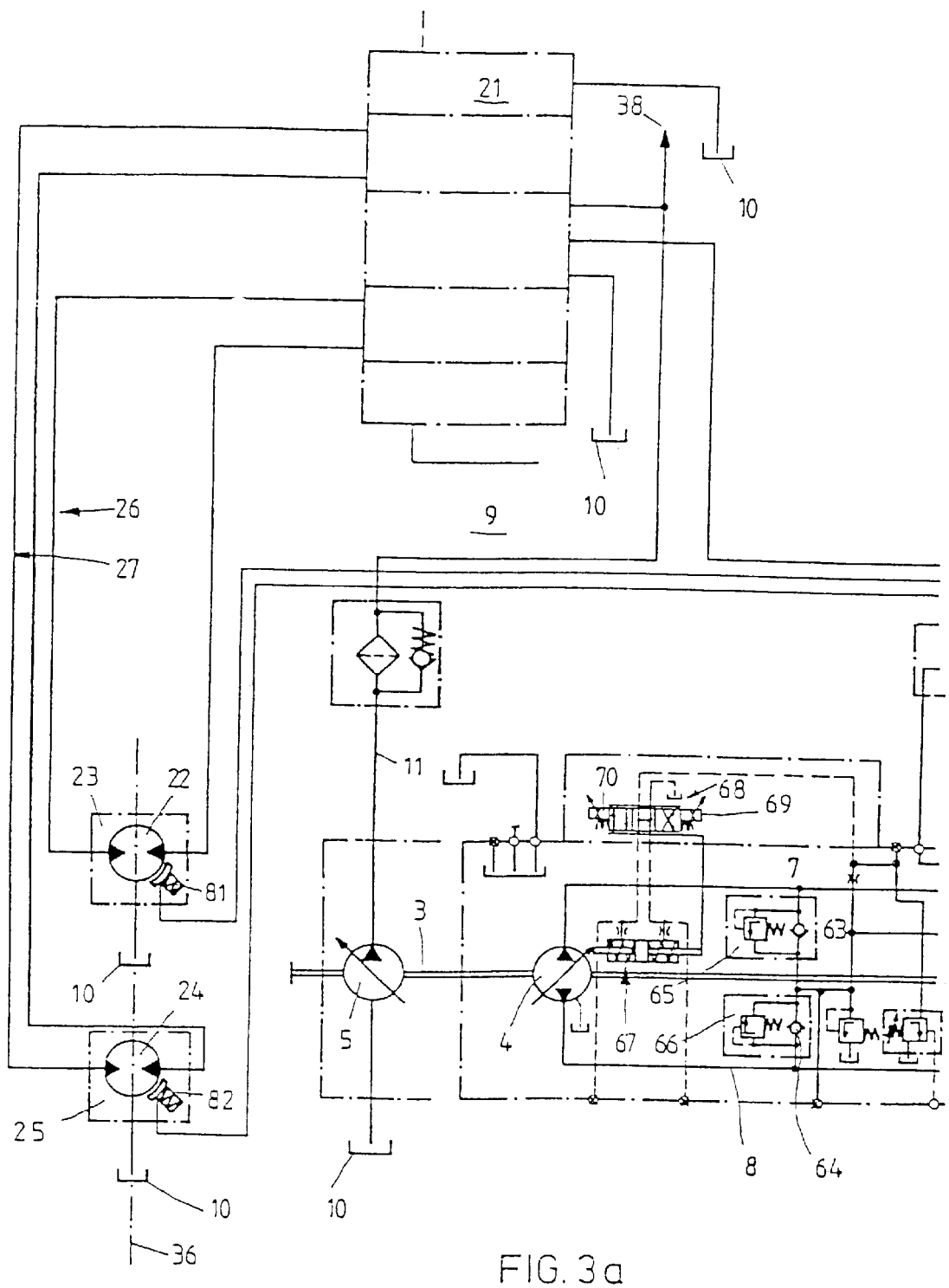
FIG. 3A shows a first part of a hydraulic circuit diagram of a second exemplary embodiment of the invention.
Figure 3B:
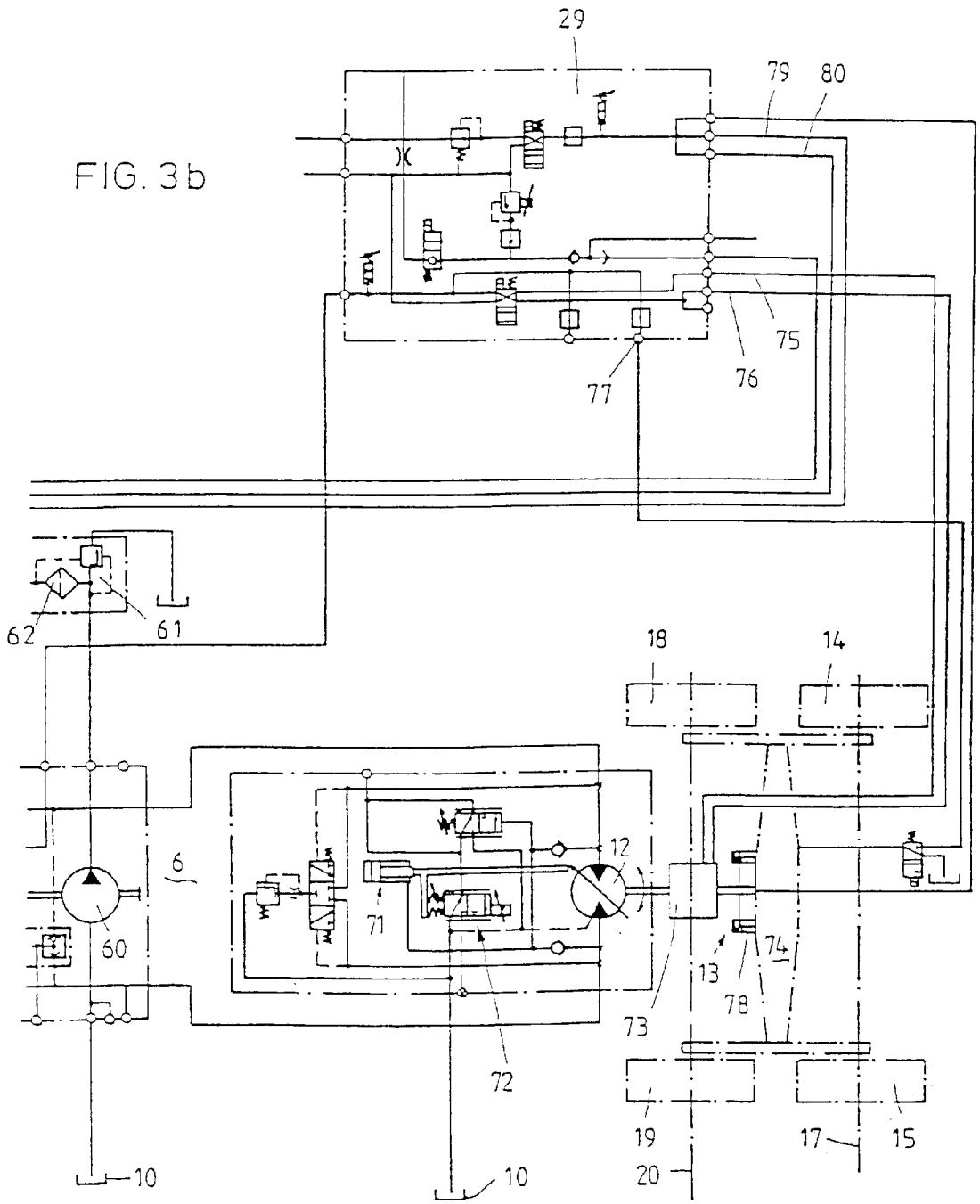
FIG. 3B shows the second part of the hydraulic circuit diagram of the second exemplary embodiment of the invention.

FIGS. 3A and 3B show an exemplary embodiment of the drive according to the invention in a more detailed representation than FIG. 1. To facilitate association, components which have already been described are provided with corresponding reference numerals.

An internal combustion engine, not illustrated in FIGS. 3A and 3B, drives the drive shaft 3 and thus the first hydraulic pump 4 and the second hydraulic pump 5. The second hydraulic pump 5 feeds the hydraulic fluid, drawn from the hydraulic fluid tank 10, into the supply line 11. The control valve 21, which supplies the volumetric flow individually to the second hydraulic motor 22 and the third hydraulic motor 24 via the auxiliary circuits 26 and 27, is situated in the supply line 11 of the open hydraulic circuit 9.

The closed hydraulic circuit 6 comprises the hydraulic pump 4 and the hydraulic motor 12, which are connected via the lines 7 and 8. An auxiliary pump 60, which feeds hydraulic fluid into the line 7 or 8, when conducting low pressure, via a pressure control valve 61 and a filter 62 and also one of the two nonreturn valves 63 and 64, is situated on the drive shaft 3. For pressure control of the line 7 and 8, when conducting high pressure, two pressure control valves 65 and 66 respectively are used. The adjusting device 67 of the hydraulic pump 4 is electromagnetically adjusted via a pilot valve 68 by means of two electromagnets 69 and 70. In a corresponding fashion, the adjusting device 71 of the first hydraulic motor 12 is electrically controlled via an electromagnetically adjustable control valve 72. A two-stage change-speed gear 73 is situated between the first hydraulic pump 12 and the vehicle wheels 14, 15, 18 and 19 in order to increase the efficiency of the drive train via the closed hydraulic circuit 6. Connected downstream of the mechanical change-speed gear 73 is a differential gear 74. Part of the drive controller 29 is of hydraulic design in the exemplary embodiment illustrated, two control outputs 75 and 76 of the drive controller 29 controlling the change-speed gear 73. One control output 77 of the drive controller 29 controls a braking device 78 of the front vehicle axles 17 and 20, whereas two control outputs 79 and 80 control two braking devices 81 and 82 of the second hydraulic motor 22 and of the third hydraulic motor 24, respectively. The braking devices 78, 81 and 82 are used to stop the drive rapidly during vehicle braking.

The invention combines the advantages of a drive having a closed hydraulic circuit 6 with the advantages of a drive having an open hydraulic circuit 9. Besides the cornering control, the drive controller 29 can also take over the function of the level control of the driving wheels. The hydraulic pumps 4 and 5 are preferably dimensioned in such a way that they provide a sufficient delivery even at low rotational speed, in order to avoid unnecessary noise generation. The functions of the hydrostatic drive and the functions of the additional hydraulic components 38 and 50a to 50g can be provided with preset priorities, so that when the maximum delivery rate of the hydraulic pump 5 is reached only certain preferred functions, for example the drive and the cornering control, are maintained.

What is claimed is:

1. Hydrostatic drive (1) with a first hydraulic pump (4) and with a first hydraulic motor (12) which is connected to the first hydraulic pump (4) in a closed hydraulic circuit (6) via a forward-flow line (7) and a return-flow line (8) an drives at least one first vehicle wheel (14, 15, 18, 19), characterized by a second hydraulic pump (5) and a second hydraulic motor (22) which is connected to the second hydraulic pump (5) in an open hydraulic circuit (9) via a supply line (11) and drives at least one second vehicle wheel (23), the return of the hydraulic fluid from the second hydraulic motor (22) to the second hydraulic pump (5) taking place via a hydraulic fluid tank (10), a control valve (21) which supplies the second hydraulic motor (22) with a variable volumetric flow dependent on a control signal controlling the control valve (21) being arranged in the supply line (11) of the open hydraulic circuit (9), said first hydraulic motor (12) driving the vehicle wheels (14, 15) of at least one first vehicle axle (17), wherein besides the second hydraulic motor (22) a third hydraulic motor (25) is connected to the control valve (21), the second hydraulic motor (22) and the third hydraulic motor (24) driving opposite vehicle wheels (23, 25) of a second vehicle axle (36), and the control valve (21) supplying the second hydraulic motor (22) and the third hydraulic motor (23) with separate, variable volumetric flows in dependence on the control signal.

2. Hydrostatic drive according to claim 1, wherein the second and third hydraulic motors (22, 24) are connected to the hydraulic fluid tank (10) via the control valve (21).

3. Hydrostatic drive according to claim 1, the control valve (21) having a drive controller (29) connected thereto which, in dependence on a detected actual kink angle (a) between the first vehicle axle (17) and the second vehicle axle (36) and/or a detected actual rotational speed (n) of at least one of the vehicle axles (17, 36), controls the control valve (21) such that the latter supplies the second and third hydraulic motor (22, 24) with such separate volumetric flows that the vehicle wheels (23, 25) of the second vehicle axle (36) rotate in a slip-free manner.

4. Hydrostatic drive according to claim 3, wherein in dependence on a desired kink angle (α'), which is presettable through a control transmitter (33), between the first vehicle axle (17) and the second vehicle axle (36) and/or a desired rotational speed (n') which is presettable, the drive controller (29) controls the control valve (21) such that the latter supplies the second and third hydraulic motor (22, 24) with such separate volumetric flows that the actual kink angle (α) approaches the desired kink angle (α') and/or the actual rotational speed (n) approaches the desired rotational speed (n').

5. Hydrostatic drive (1) with a first hydraulic pump (4) and with a first hydraulic motor (12) which is connected to the first hydraulic pump (4) in a closed hydraulic circuit (6) via a forward-flow line (7) and a return-flow line (8) an drives at least one first vehicle wheel (14, 15, 18, 19), characterized by a second hydraulic pump (5) and a second hydraulic motor (22) which is connected to the second hydraulic pump (5) in an open hydraulic circuit (9) via a supply line (11) and drives at least one second vehicle wheel (23), the return of the hydraulic fluid from the second hydraulic motor (22) to the second hydraulic pump (5) taking place via a hydraulic fluid tank (10), a control valve (21) which supplies the second hydraulic motor (22) with a variable volumetric flow dependent on a control signal controlling the control valve (21) being arranged in the supply line (11) of the open hydraulic circuit (9), wherein above a limit speed of a vehicle driven by the hydrostatic drive (1), the control valve (21) switches hydraulic motors (22, 24) connected thereto into freewheel operation and the drive then takes place exclusively via the closed hydraulic circuit (6).

6. Hydrostatic drive (1) with a first hydraulic pump (4) and with a first hydraulic motor (12) which is connected to the first hydraulic pump (4) in a closed hydraulic circuit (6) via a forward-flow line (7) and a return-flow line (8) an drives at least one first vehicle wheel (14, 15, 18, 19), characterized by a second hydraulic pump (5) and a second hydraulic motor (22) which is connected to the second hydraulic pump (5) in an open hydraulic circuit (9) via a supply line (11) and drives at least one second vehicle wheel (23), the return of the hydraulic fluid from the second hydraulic motor (22) to the second hydraulic pump (5) taking place via a hydraulic fluid tank (10), wherein further hydraulic components (38, 50a–50g) are driven by the open hydraulic circuit (9).

7. Hydrostatic drive according to claim 6, wherein the first hydraulic pump (4) and the second hydraulic pump (5) are driven by a common internal combustion engine (2).

8. Hydrostatic drive according to claim 7, wherein said further hydraulic components (38, 50a–50g) are hydraulic components of a crane.

* * * * *